United States Patent
Gramann et al.

(10) Patent No.: US 12,556,052 B2
(45) Date of Patent: Feb. 17, 2026

(54) DIRECT SLOT COOLING IN ELECTRIC MACHINES

(71) Applicant: Schaeffler Technologies AG & Co. KG, Herzogenaurach (DE)

(72) Inventors: Patrick Gramann, Renchen (DE); Michael Heilmann, Karlsruhe (DE); Jonas Kniel, Karlsruhe (DE); Alexander Keune, Kappelrodeck (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 223 days.

(21) Appl. No.: 18/555,042

(22) PCT Filed: Feb. 23, 2022

(86) PCT No.: PCT/DE2022/100143
§ 371 (c)(1),
(2) Date: Oct. 12, 2023

(87) PCT Pub. No.: WO2022/218458
PCT Pub. Date: Oct. 20, 2022

(65) Prior Publication Data
US 2024/0195251 A1    Jun. 13, 2024

(30) Foreign Application Priority Data
Apr. 12, 2021  (DE) .......................... 102021109007.5

(51) Int. Cl.
*H02K 3/24* (2006.01)
*H02K 3/48* (2006.01)

(52) U.S. Cl.
CPC ................. *H02K 3/24* (2013.01); *H02K 3/48* (2013.01)

(58) Field of Classification Search
CPC ............... H02K 3/24; H02K 3/48; H02K 1/20
(Continued)

(56) References Cited

U.S. PATENT DOCUMENTS

| 4,994,700 A * | 2/1991 | Bansal | H02K 3/48 310/60 A |
| 11,605,995 B2 * | 3/2023 | Sangha | H02K 3/12 |

(Continued)

FOREIGN PATENT DOCUMENTS

| DE | 574962 | 4/1933 |
| DE | 19737163 | 3/1999 |

(Continued)

*Primary Examiner* — Ahmed Elnakib
(74) *Attorney, Agent, or Firm* — Volpe Koenig

(57) ABSTRACT

A stator of a dynamoelectric rotary machine includes a stator body which has substantially axially extending slots, a stator winding, the conductors of which are located in the slots and spacers for positioning the conductors in the slots such that a cavity for the passage of a cooling medium that is continuous over the entire axial length of the slot, remains between the slot walls and the conductors. The stator body is a laminated core having stator sheets stacked axially on top of one another and intermediate sheets that act as spacers located between the stator sheets, the intermediate sheets being axially spaced apart from one another over a plurality of stator sheets and having retainers for retaining and positioning the conductors such that, between each pair of intermediate sheets, the conductors are positioned spaced apart from the walls of the slot in a free-floating manner.

17 Claims, 4 Drawing Sheets

(58) Field of Classification Search
USPC .......................................................... 310/215
See application file for complete search history.

(56) References Cited

U.S. PATENT DOCUMENTS

| | | | | |
|---|---|---|---|---|
| 2020/0373803 | A1* | 11/2020 | Stoll | .................. H02K 3/28 |
| 2022/0393538 | A1* | 12/2022 | Engelhardt | .......... H02K 15/021 |
| 2024/0195251 | A1* | 6/2024 | Gramann | ................. H02K 1/20 |
| 2025/0088048 | A1* | 3/2025 | Kronsteiner | ............. H02K 3/24 |

FOREIGN PATENT DOCUMENTS

| | | |
|---|---|---|
| DE | 102018116031 | 1/2020 |
| DE | 102019113785 | 11/2020 |
| DE | 102019122446 | 2/2021 |
| DE | 102019122469 | 2/2021 |

* cited by examiner

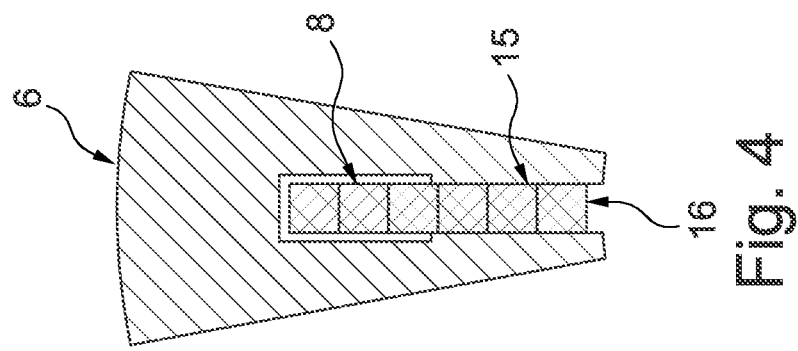
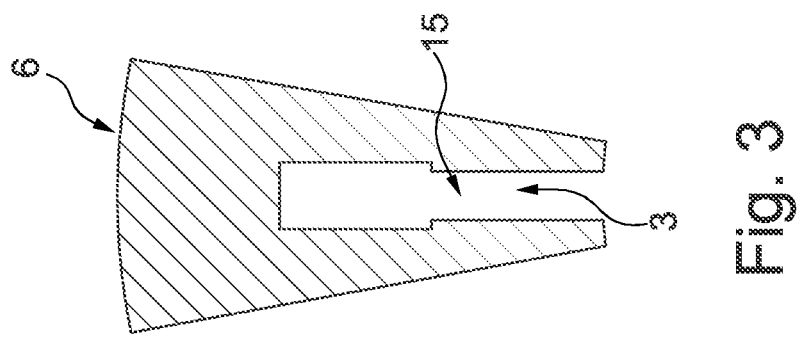
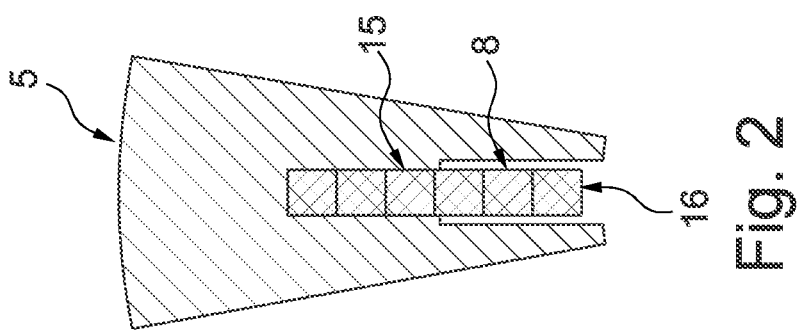
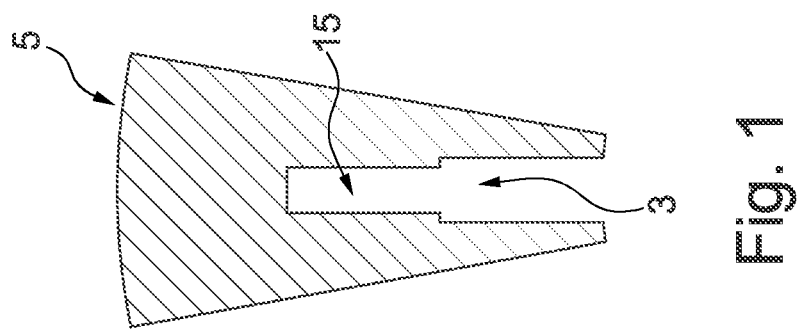

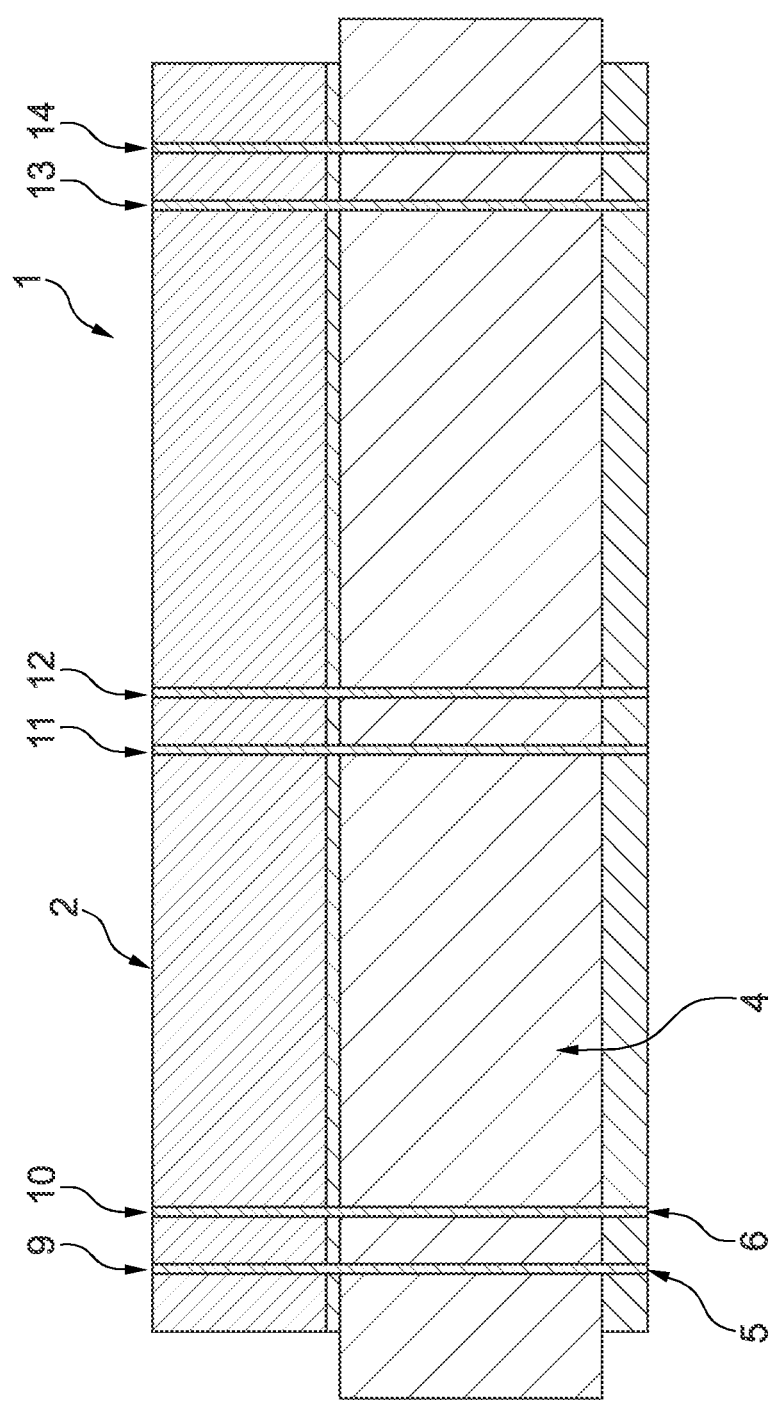
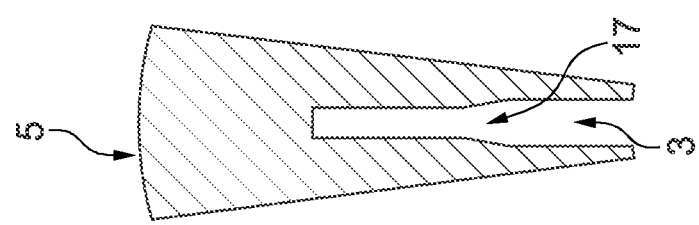
Fig. 6
Fig. 5

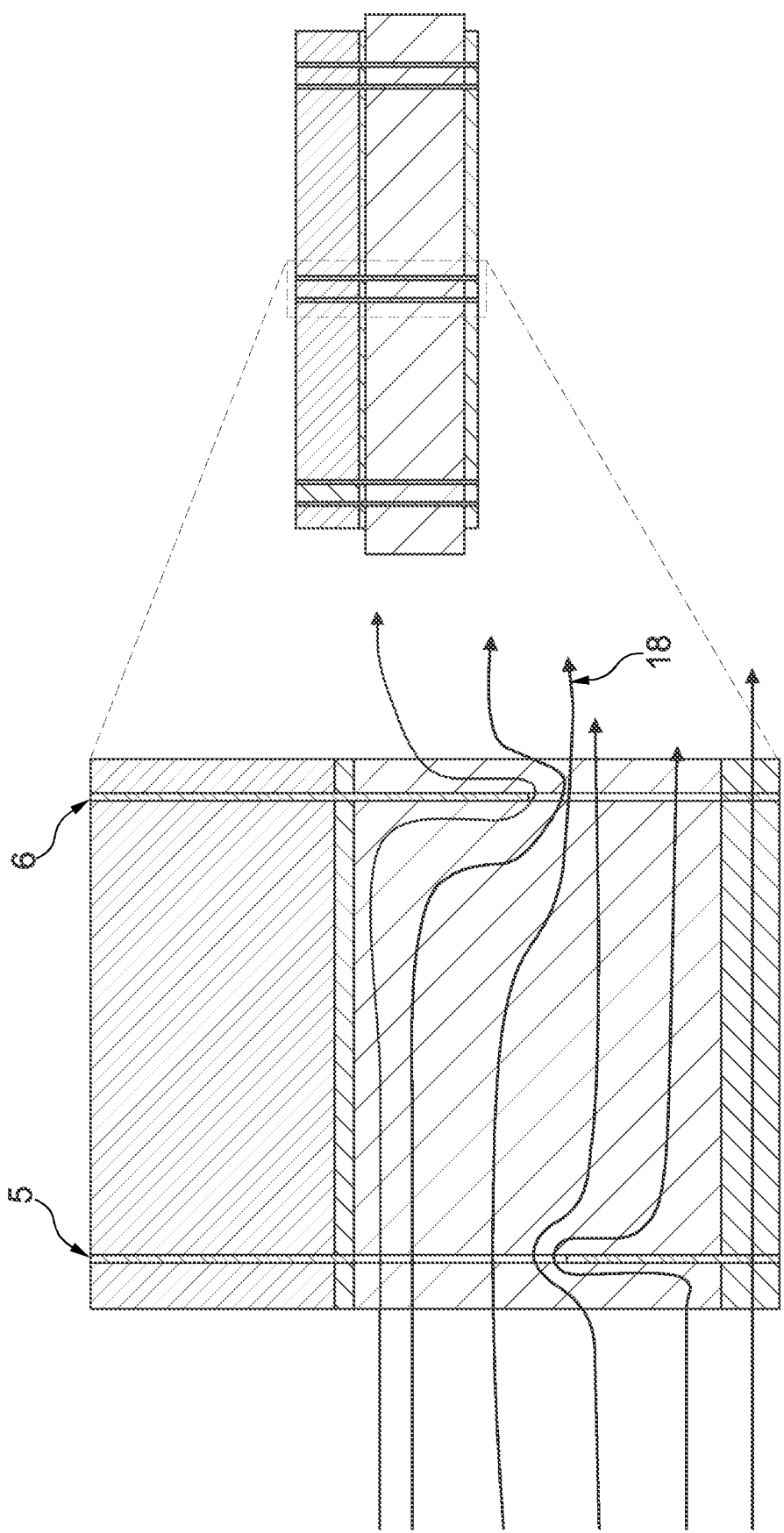

DIRECT SLOT COOLING IN ELECTRIC MACHINES

CROSS-REFERENCE TO RELATED APPLICATIONS

This application is the U.S. National Phase of PCT Appln. No. PCT/DE2022/100143, filed Feb. 23, 2022, which claims priority from German Patent Application No. 10 2021 109 007.5, filed Apr. 12, 2021, the entire disclosures of which are incorporated by reference herein.

TECHNICAL FIELD

The disclosure relates to a stator of a dynamoelectric rotary machine and to a dynamoelectric machine having such a stator. An electric machine according to the disclosure can be used, for example, to drive an electric vehicle.

BACKGROUND

Power loss occurs in the active operation of electric machines. This power loss generates heat that must be dissipated in order to prevent damage to the active and passive parts of the machine. In particular in the field of electromobility, very high energy densities are sought for electric machines in order to allow for traction drives offering high levels of performance with limited installation space. Such energy densities usually require active cooling, since the dissipation of the heat generated via free convection with the ambient air is generally not capable of achieving the necessary heat removal. Such active cooling can, for example, be provided by a moving fluid. In an electric machine designed as an internal rotor, for example, a cooling jacket is provided which encloses the external stator of the machine and has cooling channels through which a cooling fluid flows. The cooling jacket is shrunk onto the stator, for example, in order to make the heat transfer from the stator laminated core to the cooling medium as efficient as possible.

Alternative cooling methods aim to dissipate the heat as close as possible to the point of origin, for example the windings, magnets or iron sheets. For example, DE 10 2019 122 469 A1 describes a stator of an electric machine in which a spacer ensures a defined distance between the electrical conductor of the windings and the laminated core in slots of the stator. The intermediate space thus obtained serves as a flow path for a coolant. This allows heat to be dissipated directly in the immediate vicinity of the stator winding.

SUMMARY

The object of the disclosure is that of providing a structurally simple and effective way to provide a cavity for the passage of a cooling fluid in slots of a stator.

This object is achieved by a stator of a dynamoelectric rotary machine having one or more of the features disclosed herein. Advantageous embodiments can be found below and in the claims.

The stator according to the disclosure is provided with a stator body of substantially cylindrical or hollow-cylindrical design. This stator body is formed with substantially axially extending slots in which conductors of a stator winding are arranged. In this regard, multiple conductors can be arranged in one slot. These can be bar conductors which, for example, lie radially one above the other in the slot.

For the purposes of the disclosure, substantially axially arranged slots are also to be understood as slots which have an inclination and thus a slight angle of attack with respect to the axis of rotation of the stator. Slots designed substantially axially but with a slight inclination with respect to the axis of rotation of the stator are used to reduce slot detent torques in electric machines and are accordingly also encompassed by the disclosure.

To allow the heat generated by the stator winding to be dissipated as efficiently as possible, the slots are penetrated by a continuous cavity. This cavity is located in the respective slot between the conductor or conductors inserted in the slot and the walls of the slots in each case and is used for the passage of a cooling medium, for example oil or water.

The corresponding positioning of the conductors in the slots is realized by means of spacers. The disclosure now proposes a very simple way to enable this spacer function with only a few elements and not to equip the entire axial length of the slot with elements for positioning the conductors, as known from the prior art. Rather, according to the disclosure, it is proposed that the spacers are distributed at axially spaced apart positions. The conductors of the stator windings are positioned between pairs of spacers in each case in a free-floating manner and spaced apart from the walls of the slot. The fixation of this free-floating position of the conductors within the slot is realized by means of the spacers arranged at discrete locations. Only as many spacers need to be provided within the axial length of the stator laminated core as are necessary to ensure the free-floating positioning between the spacers, thereby providing a cavity for the cooling fluid to flow around the conductor(s) arranged in the slot between the spacers, if possible, on all sides.

In particular, if the conductors are designed as bar conductors, comparatively few spacers need to be provided. This is due to the fact that a bar conductor has a comparatively flexurally rigid structure which largely prevents the conductors from sagging between two spacer elements and thus contacting a slot wall. In this regard, multiple bar conductors can also be arranged in a single slot. The multiple bar conductors can thus be positioned in the slot to form a bundle of bar conductors. Such a bundle of bar conductors is completely surrounded by the cavity between the spacers, for example, so that this bundle of bar conductors is arranged in a free-floating manner between the walls of the slot. In this regard, the bar conductors can, for example, be stacked radially on top of one another in the slot.

The stator body is designed as a laminated core in which individual electrical laminations are stacked axially on top of one another and joined together, for example, by means of a punch-packaging process. Intermediate sheets are arranged between the individual stator sheets stacked axially on top of one another and perform the function of the spacers according to the disclosure. Multiple stator sheets are located between two such intermediate sheets, which are axially spaced apart from one another. The intermediate sheets comprise retaining means for retaining and positioning the conductors within the slot. The intermediate sheets thus ensure that the conductors are arranged in the slot in a free-floating manner between a pair of intermediate sheets in each case, without touching the slot wall.

Said retaining means can be designed as a slot taper within the intermediate sheets. This slot taper is designed in such a way that the conductors are connected to the intermediate sheets in their region in a force-fitting, form-fitting or materially bonded manner. In this embodiment, the cavity, which is provided for the passage of the cooling medium, for example an oil or water, remains outside of the region of the slot taper. This ensures that the cavity remains continuous over the entire axial length of the slot, allowing the cooling medium to flow through the entire slot. Only the taper inevitably reduces the cross-sectional area of the cooling channel, which must be designed in such a way that it causes only a slight pressure loss in the coolant flow.

In a first variant, the slot taper can be arranged in the region of the base of the slot. This fixes the conductors in the region of the base of the slot to the intermediate sheets so that the cavity is provided in the region of the slot facing the slot opening. Alternatively, according to a second variant, the intermediate sheets can be tapered towards an end facing radially away from the base of the slot, i.e. in the direction of the slot opening. Accordingly, in this variant, at the location of the intermediate sheets, the cavity remains in the region of the slot facing the base of the slot.

In another advantageous embodiment, intermediate sheets of the first and second variant are arranged in pairs spaced apart from one another by stator sheets at the axially spaced apart positions. In each case, an intermediate sheet of the first variant forms a pair with an intermediate sheet of the second variant. The coolant flow is thus diverted between the two intermediate sheets from the base of the slot to the slot opening or vice versa.

In particular, if the stator winding has to be inserted into the slots of the stator body from a radial direction, it can be useful to have a bevel on the intermediate sheets that forms a transition between the non-tapered region of the slot and the tapered region of the slot. If, for example, the tapered region of the slot is located at the base of the slot as in the first variant, the bevel forms a guide for the conductor(s) into the tapered region of the slot, in which the conductors are retained, for example, in a force-fitting manner.

To ensure insulation of the stator core from the windings, insulating papers are often inserted into the slots according to the prior art. These insulating papers occupy space in the slot that is available neither for electrical conductors and thus for a high copper fill factor nor for a cooling medium. If the spacers are now made of an electrically insulating material, in particular plastic, in some cases it can even be possible to dispense with the use of such insulating paper. This is because in the region of the spacers, this insulation is ensured in this embodiment by the spacer itself acting as an insulator. Outside of the spacers, i.e. in the axial intermediate space that remains between each pair of spacers, the conductors are arranged according to the disclosure in a free-floating manner between the walls of the slot. Consequently, insulation in this region can be ensured by the cavity that remains.

Windings are also known which can be inserted into the slots not only from the radial direction, but also axially on the face side. An example of this is the so-called hairpin winding. Particularly in such windings, an embodiment of the disclosure can be advantageous in which the spacers position the bar conductors arranged in a slot radially spaced apart from one another, so that a cavity is formed between radially superimposed conductors in each case for the passage of the cooling medium. If a plurality of bar conductors are now arranged radially stacked one above the other in the slot in such an embodiment, they can be cooled even more effectively, since a cavity for the passage of the cooling medium also remains between each pair of these bar conductors.

BRIEF DESCRIPTION OF THE DRAWINGS

The disclosure is explained below with reference to the examples shown in the figures. As a rule, the same reference symbols are used for elements that have the same functional effect.

In the figures:

FIG. 1: shows a first variant of an intermediate sheet for positioning conductors in a slot, FIG. 2: shows the intermediate sheet according to FIG. 1 with inserted conductors, FIG. 3: shows a second variant of an intermediate sheet for positioning conductors in a slot, FIG. 4: shows the intermediate sheet according to FIG. 3 with inserted conductors, FIG. 5: shows an intermediate sheet of the second variant with a bevel, FIG. 6: shows a partial cross-section through a stator body with intermediate sheets arranged in pairs, FIG. 7: shows a coolant flow between a pair of intermediate sheets in the embodiment according to FIG. 6, FIG. 8: shows a third variant of an intermediate sheet for positioning conductors in a slot

DETAILED DESCRIPTION

Figure 9:
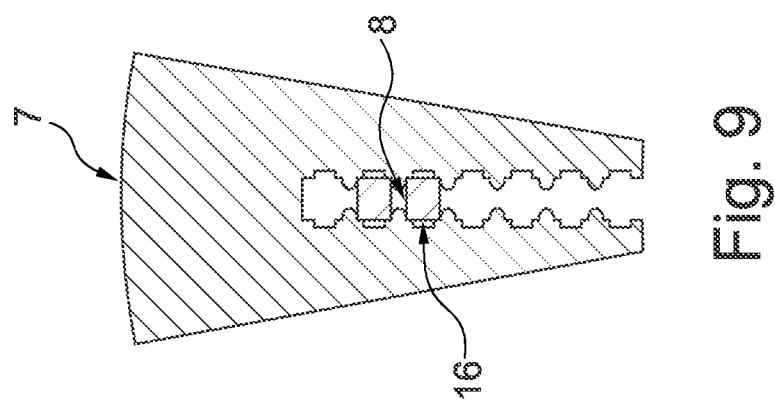
FIG. 9: shows the intermediate sheet according to FIG. 8 with inserted conductors.

FIG. 1 shows a first variant of an intermediate sheet 5 for positioning conductors 16 in a slot 3. FIG. 2 shows the intermediate sheet 5 according to FIG. 1 with inserted conductors 16.

The intermediate sheet 5 performs the function of the spacer according to the disclosure. It therefore has the task of retaining the conductors 16 at discrete positions distributed over the axial slot length in such a way that they are supported in a free-floating manner in the slots 3 outside of the region axially occupied by the intermediate sheets 5. To fulfill this retaining function, these intermediate sheets 5 have a slot taper 15. This slot taper 15 is characterized in that the extension of the slot 3 in the region of the slot taper 15 in the circumferential direction of the stator is smaller than outside of the slot taper 15. The region of the slot taper 15, which in this first variant of the intermediate sheet 5 is arranged in the region of the base of the slot, thus fulfills the function of fixing the conductors 16. This fixation can be achieved in a force-fitting, form-fitting or materially bonded manner. As can be seen in FIG. 2, a cavity 8 remains in the slot region that lies outside of the slot taper 15. This cavity allows a coolant flowing through the slot 3 to continue to flow around the conductors 16. Only in the region of the intermediate sheets 5 shown here is there no flow through the part of the conductors 16 or the conductors 16 of a conductor bundle that is retained on the intermediate sheet 5. Normal stator sheets which do not have the taper 15 shown are located outside of the intermediate sheets 5. Accordingly, the cavity 8 extends everywhere outside of the intermediate sheets 5 around the complete bundle of conductors 16. Thus, excellent heat dissipation from the surface of the bundle of conductors 16 can be achieved here.

FIG. 3 shows a second variant of an intermediate sheet 6 for positioning conductors 16 in a slot 3. FIG. 4 shows the intermediate sheet 6 according to FIG. 3 with inserted conductors 16. The only difference from the embodiment according to FIGS. 1 and 2 is that here the slot taper 15 extends in the region of the slot 3 facing the slot opening. Here as well, the slot taper 15 has the function of retaining the conductors 16. Outside of the slot taper 15, now in the region facing the base of the slot, a cavity 8 can be formed for the cooling fluid.

FIG. 5 shows an intermediate sheet of the first variant 5 with a bevel 17. The bevel 17 initiates the transition from the non-tapered region of the slot 3 to the tapered region of the slot 3. The advantage of this bevel 17 is that when bar conductors, for example, are inserted into the slot 3 from the radially inner region, guidance of the conductors 16 is ensured. This prevents the possibility that the conductors 16 may get caught on an edge during insertion, for example.

FIG. 6 shows a partial cross-section through a stator body 2 with intermediate sheets 5, 6 arranged in pairs. Here, intermediate sheets of the first variant 5 and the second variant 6 are arranged in pairs in each case distributed along the axial length of the stator. Thus, an intermediate sheet of the first variant 5 is located at a first position 9. An intermediate sheet of the second variant 6 is located at a second position 10. Between these two intermediate sheets 5, 6, numerous ordinary stator sheets are located, the slot 3 of which has no taper. This paired arrangement of an intermediate sheet of the first variant 5 and an intermediate sheet of the second variant 6 is repeated at a third position 11 and fourth position 12, and at a fifth position 13 and a sixth position 14. Here, too, ordinary stator sheets without slot tapering are arranged between the two intermediate sheets 5, 6 of such a pair. A total of six intermediate sheets 5, 6 are thus sufficient to position the conductors in the slot 3 over the entire axial length outside of the intermediate sheets 5, 6 in such a way that a cavity remains around the conductors 16 for conducting the cooling medium.

FIG. 7 shows a coolant flow 18 between a pair of intermediate sheets 5, 6 in the embodiment according to FIG. 6. Since the intermediate sheet of the first variant 5 has the cavity in the region facing the slot opening and the intermediate sheet of the second variant 6 has this cavity in the region facing the base of the slot, the coolant flow is diverted between these two intermediate sheets 5, 6.

Figure 8:
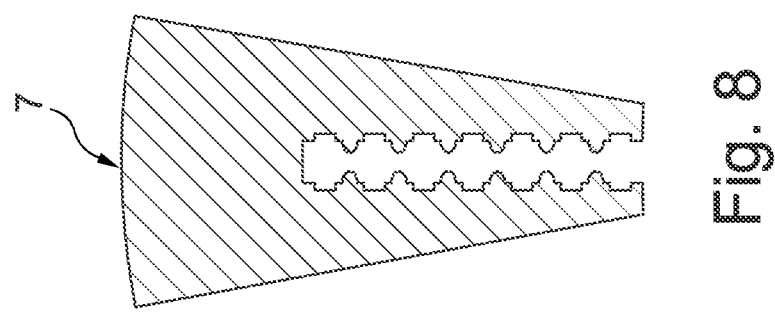

FIG. 8 shows a third variant of an intermediate sheet 7 for positioning conductors 16 in a slot 3, and FIG. 9 the intermediate sheet according to FIG. 8 with inserted conductors 16. Such an embodiment can be used if the conductors 16 can be inserted into the slots 3 on the face side. This is the case, for example, with a hairpin winding. Here, as shown, the conductors 16 can be positioned radially spaced apart from one another within the slot 3, so that a cavity can also be formed in the radial direction between the conductors 16 inserted in a slot 3. This can further improve the heat dissipation of the conductors 16, since coolant can now flow around the entire surface of each individual conductor 16 within a slot 3 and outside the intermediate sheets 7. At the axial position where the intermediate sheets 7 are arranged, a cavity between the radially spaced apart conductors 16 can still be ensured within the slot 3, as shown

LIST OF REFERENCE SYMBOLS

1 Stator
2 Stator body
3 Slot
4 Stator winding
5 First variant of intermediate sheets
6 Second variant of intermediate sheets
7 Third variant of intermediate sheets
8 Cavity
9 First position
10 Second position
11 Third position
12 Fourth position
13 Fifth position
14 Sixth position
15 Slot taper
16 Conductor
17 Bevel
18 Coolant flow

The invention claimed is:

1. A stator of a dynamoelectric rotary machine, the stator comprising:
   a stator body that is substantially cylindrical or hollow-cylindrical and having substantially axially extending slots;
   a stator winding including conductors arranged in the slots; spacers for positioning the conductors in the slots in such that a cavity, adapted for the passage of a cooling medium, that is continuous over an entire axial length of the slots, is located between walls of the slots and the conductors; the stator body is formed as a laminated core having stator sheets that are stacked axially on top of one another and intermediate sheets arranged between the stator sheets as spacers; and
   the intermediate sheets are arranged axially spaced apart from one another over a plurality of stator sheets and comprise retainers for retaining and positioning the conductors such that between each pair of the intermediate sheets, the conductors are positioned free-floating, spaced apart from the walls of the slot;
   wherein the retainer comprises slot tapers in the intermediate sheets that connect the conductors in a region of a respective one of the slot tapers to a respective one of the slots in at least one of a force-fitting, form-fitting or materially bonded manner and the cavity for the passage of the cooling medium remains outside the region of the slot taper.

2. The stator according to claim 1, further comprising a bevel at a transition between a non-tapered region of the slot and the tapered region of the slot.

3. The stator according to claim 1, wherein the intermediate sheets are formed of an electrically insulating material.

4. The stator according to claim 1, wherein the conductors comprise bar conductors and multiple ones of the bar conductors are arranged in each said slot.

5. The stator according to claim 4, wherein the intermediate sheets position the bar conductors arranged in each said slot radially spaced apart from one another, so that the cavity for the passage of the cooling medium is formed between radially superimposed ones of the conductors.

6. An electric machine comprising the stator according to claim 1.

7. A stator of a dynamoelectric rotary machine, the stator comprising:
   a stator body that is substantially cylindrical or hollow-cylindrical and having substantially axially extending slots;
   a stator winding including conductors arranged in the slots; spacers for positioning the conductors in the slots in such that a cavity, adapted for the passage of a cooling medium, that is continuous over an entire axial length of the slots, is located between walls of the slots and the conductors; the stator body is formed as a laminated core having stator sheets that are stacked axially on top of one another and intermediate sheets arranged between the stator sheets as spacers; and
   the intermediate sheets are arranged axially spaced apart from one another over a plurality of stator sheets and comprise retainers for retaining and positioning the conductors such that between each pair of the intermediate sheets, the conductors are positioned free-floating, spaced apart from the walls of the slot wherein the intermediate sheets have a first variant in which the slots are tapered towards a base of the respective slots.

8. The stator according to claim 7, wherein the intermediate sheets have a second variant in which the slots are tapered towards an end radially facing away from the base of the respective slots.

9. The stator according to claim 8, wherein the intermediate sheets of the first and the second variant are arranged in pairs spaced apart from one another by stator sheets at the axially spaced apart positions.

10. A stator of a dynamoelectric rotary machine, the stator comprising:
   a stator body having substantially axially extending slots;
   a stator winding including conductors arranged in the slots;
   spacers for positioning the conductors in the slots such that a cavity, adapted for the passage of a cooling medium, that is continuous over an entire axial length of the slots, is located between walls of the slots and the conductors; the stator body comprises a laminated core having stator sheets that are stacked axially on top of one another and intermediate sheets arranged between the stator sheets; and
   the intermediate sheets are arranged axially spaced apart from one another and comprise retainers for retaining and positioning the conductors such that the conductors are positioned free-floating between each pair of the intermediate sheets;
   wherein the retainer comprises slot tapers in the intermediate sheets that connect the conductors in a region of a respective one of the slot tapers to a respective one of the slots in at least one of a force-fitting, form-fitting or materially bonded manner, and the cavity for the passage of the cooling medium remains outside the region of the slot tapers.

11. The stator according to claim 10, wherein the intermediate sheets have a first variant in which the slots are tapered towards a base of the respective slots.

12. The stator according to claim 11, wherein the intermediate sheets have a second variant in which the slots are tapered towards an end radially facing away from the base of the respective slots.

13. The stator according to claim 12, wherein the intermediate sheets of the first and the second variant are arranged in pairs spaced apart from one another by stator sheets at the axially spaced apart positions.

14. The stator according to claim 10, further comprising a bevel at a transition between a non-tapered region of the slot and the tapered region of the slot.

15. The stator according to claim 10, wherein the intermediate sheets are formed of an electrically insulating material.

16. The stator according to claim 10, wherein the conductors comprise bar conductors and multiple ones of the bar conductors are arranged in each said slot.

17. The stator according to claim 16, wherein the intermediate sheets position the bar conductors arranged in each said slot radially spaced apart from one another, so that the cavity for the passage of the cooling medium is formed between radially superimposed ones of the conductors in each said slot.

* * * * *